United States Patent [19]

Izumitani et al.

[11] 4,239,645

[45] Dec. 16, 1980

[54] PHOSPHATE BASE LASER GLASSES

[75] Inventors: Tetsuro Izumitani, Hino; Michitaka Tsuru, Akishima, both of Japan

[73] Assignee: Hoya Glass Works, Ltd., Tokyo, Japan

[21] Appl. No.: 667,756

[22] Filed: Mar. 17, 1976

[30] Foreign Application Priority Data

Mar. 18, 1975 [JP] Japan .................................. 50-32696

[51] Int. Cl.$^2$ ........................ C03C 3/16; C09K 11/42; C09K 11/46; C03C 3/28
[52] U.S. Cl. ...................... 252/301.4 P; 252/301.6 P; 106/47 Q
[58] Field of Search ............................ 106/47 Q, 47 R; 252/301.4 P, 301.6 P; 331/94.5 E

[56] References Cited

U.S. PATENT DOCUMENTS

| | | | |
|---|---|---|---|
| 3,580,859 | 5/1971 | Buzhinsky et al. | 252/301.4 P |
| 3,731,226 | 5/1973 | Snitzer et al. | 331/94.5 E |
| 3,846,142 | 11/1974 | Buzhinsky et al. | 252/301.4 P |
| 4,022,707 | 5/1977 | Deutschbein | 106/47 Q |

*Primary Examiner*—O. R. Vertiz
*Assistant Examiner*—Mark Bell
*Attorney, Agent, or Firm*—Sughrue, Rothwell, Mion, Zinn and Macpeak

[57] ABSTRACT

A phosphate base laser glass comprising 55–70% $P_2O_5$, 1–15% $Al_2O_3$, 0–25% $Li_2O$, 0–25% $Na_2O$, 0–8% $K_2O$, the total proportion of $Li_2O$, $Na_2O$, and $K_2O$ being 10–25%, 0–15% BaO, 0–15% ZnO, 0–15% CaO, 0–15%, SrO, 0–15% MgO, the total proportion of BaO, ZnO, CaO, SrO, and MgO being 5–15%, 0–5% $Y_2O_3$, 0–5% $La_2O_3$, 0–5% $GeO_2$, 0–5% $CeO_2$, 0–3% $Nb_2O_5$, 0–3% $MnO_2$, 0–2% $Ta_2O_5$, 0–1% $Sb_2O_3$, and 0.01–5% $Nd_2O_3$, all % being mole %.

The phosphate base laser glass of this invention has a high induced emission cross section, a low non-linear refractive index coefficient, and excellent acid resistance and divitrification resistance. By replacing partially or wholly one or more of $LiO_2$, $Na_2O$, $K_2O$, BaO, ZnO, CaO, SrO, MgO or $Al_2O_3$ by LiF, NaF, KF, $BaF_2$, $ZnF_2$, $CaF_2$, $SrF_2$, $MgF_2$ or $AlF_3$, respectively, the above properties of the laser glass are further improved.

3 Claims, No Drawings

PHOSPHATE BASE LASER GLASSES

BACKGROUND OF THE INVENTION

1. Field of the Invention

The present invention generally relates to a phosphate base laser glass, and, more particularly, it relates to a phosphate base laser glass possessing a high induced emission cross section, a low non-linear refractive index coefficient, and excellent acid resistance and devitrification resistance.

2. Description of the Prior Art

Laser glasses for nuclear fusion have recently been required to have a high amplification factor and a low non-linear refractive index coefficient (the refractive index coefficient proportional to the square of the intensity of the electric field applied to the laser).

The amplification factor G of a laser is expressed by the equation $$G = e^{N \cdot \sigma}$$

wherein N is the inversion density and $\sigma$ is the induced emission cross section. As is shown in the above equation, in order to increase the amplification factor G, the value of $N \cdot \sigma$ is required to be large, and, further, since the inversion density is determined by the input energy of a xenon flash lamp to the laser, it is desired as a characteristic of a laser glass that the induced emission cross section of the laser glass be as high as possible.

The refractive index of a laser in a high electric field is shown by the equation $$n = n_o + n_2 E^2$$

wherein $n_2$ is the non-linear refractive index coefficient, E is the intensity of the applied electric field and $n_o$ is the refractive index coefficient in a non-laser light (non-electric) field. If the non-linear refractive index coefficient is high, the laser light undergoes self-focusing to break the laser glass which makes the further use thereof difficult. Therefore, it is desired that a laser glass have a non-linear refractive index coefficient which is as low as possible. Phrased differently the lower the value of $n_2$, the stronger the power of the laser light can be. Generally, it can be used at a several G W/cm² for a nanosecond laser pulse and at a several hundred G W/cm² for a picosecond laser pulse. When $n_2$ is as low as possible, the laser glass does not break even when the upper limit of the power is high. However, in conventional silicate base laser glasses $\sigma$ is $2.5-3.0 \times 10^{-20}$ cm² and $n_2$ is $1.5-2.0 \times 10^{-13}$ e.s.u., and in conventional phosphate base laser glasses $\sigma$ is $3.0-4.0 \times 10^{-20}$ cm² and $n_2$ is $1.5-2.0 \times 10^{-13}$ e.s.u.

The laser glass disclosed in Japanese Patent Application Laid Open No. 114,615/'74 is a $P_2O_5$-alkali metal oxide-rare earth element oxide series laser glass containing a high proportion of rare earth element oxides, and the non-linear refractive index coefficient thereof is as high as $1.8-3.0 \times 10^{-13}$ e.s.u. When used as a laser glass, the laser light causes self-focusing to break the laser glass and hence makes the further use thereof difficult. On the other hand, when rare earth element oxides in the laser glass are replaced with $Al_2O_3$, the non-linear refractive index coefficient thereof becomes as high as $1.2-1.4 \times 10^{-13}$ e.s.u., and thus breakage of the laser glass will not occur.

The present applicants previously filed a patent application on a $P_2O_5$-$Li_2O$-$Na_2O$-$Al_2O_3$ series laser glass (Japanese Patent Application No. 134,788/'74). While this laser glass has a low non-linear refractive index coefficient $n_2$, it does not have excellent acid resistance and devitrification resistance due to the large proportions of $Li_2O$ and $Na_2O$ therein, which permits the utilization thereof as a laser rod.

SUMMARY OF THE INVENTION

One object of this invention is to provide a phosphate base laser glass having a high induced emission cross section, a low non-linear refractive index coefficient, and excellent acid resistance and devitrification resistance.

Another object of this invention is to provide an improved phosphate base laser glass which can provide large laser rods and laser discs without being accompanied by the heretofore discussed problems of conventional laser glass compositions.

As the result of intensive research on laser glass compositions, the inventors discovered that the aforesaid objects of this invention can be attained effectively by the laser glass of the invention which has the following composition: a phosphate base laser glass comprising 55–70% $P_2O_5$, 1–15% $Al_2O_3$, 0–25% $Li_2O$, 0–25% $Na_2O$, 0–8% $K_2O$, the total proportion of $Li_2O$, $Na_2O$, and $K_2O$ being 10–25%, 0–15% BaO, 0–15% ZnO, 0–15% CaO, 0–15% SrO, 0–15% MgO, the total proportion of BaO, ZnO, CaO, SrO, and MgO being 5–15%, 0–5% $Y_2O_3$, 0–5% $La_2O_3$, 0–5% $GeO_2$, 0–5% $CeO_2$, 0–3% $Nb_2O_5$, 0–3% $MnO_2$, 0–2% $Ta_2O_5$, 0–1% $Sb_2O_3$, and 0.01–5% $Nd_2O_3$, all percentages being molar and based upon the total moles of the glass components.

DETAILED DESCRIPTION OF THE INVENTION

As compared to conventional silicate and phosphate base laser glasses as discussed above, in the laser glass of this invention $\sigma$ is $4.20-6.5 \times 10^{-20}$ cm.² and $n_2$ is $0.7-1.40 \times 10^{-13}$ e.s.u., that is, the induced emission cross section of the laser glass of this invention is 60–100% higher than that of conventional laser glasses and the non-linear refractive index coefficient $n_2$ of the laser glass of this invention is 40–50% lower than that of conventional laser glasses.

The inventors succeeded in improving the acid resistance and devitrification resistance of the laser glass described in their earlier Japanese Patent Application No. 134,788/'74 by incorporating therein 5–15 mole percent BaO, ZnO, CaO, SrO, and/or MgO as RO components, and thus have provided a glass which can be used to form large laser rods and laser discs. The acid resistance weight loss (Da) of the laser glass of this invention is about 0.15% by weight (1/100 normal $HNO_3$ for 1 hour at 100° C.), which shows the excellent acid resistance of the laser glass of this invention. Furthermore, as to the devitrification resistance of the laser glass of this invention, the value of Tg/LT (where Tg is the transition temperature and LT is the liquid phase temperature) is above 0.4. Accordingly, the laser glass composition of this invention can be used to provide laser rods and laser discs, for example, in the last one or two years glass laser systems for use in the nuclear fusion area as have come into demand.

According to a particularly preferred embodiment of this invention, there is further provided a phosphate base laser glass comprising 58–67% $P_2O_5$, 4–10% Al- $_2O_3$, 9–15% $Li_2O$, 4–10% $Na_2O$, 0–12% CaO, 0–12% MgO, 0–12% $CaF_2$, 0–12% $MgF_2$, the total proportion of CaO, MgO, $CaF_2$, and $MgF_2$ being 5–12%, 0–3% $Y_2O_3$, 0.2–0.8% $Nb_2O_5$, and 0.2–1.5% $Nd_2O_3$, all percentages being molar and based on the total moles of the glass components, as illustrated in Examples 2 and 63 shown below.

A laser glass having the above-described preferred composition possesses excellent characteristics, that is, the acid resistance weight loss Da of the laser glass is 0.15–0.17% by weight, the devitrification resistance Tg/LT is 0.470–0.485, the induced emission cross section $\sigma$ is 4.50–5.20×$10^{-20}$ cm.$^2$, and the non-linear refractive index coefficient $n_2$ is 1.13–1.24×$10^{-13}$ e.s.u., which show the excellency of the laser glass of this invention at four characteristic points.

Each component of the laser glass of this invention will now be explained in regard to the limitations on the amount thereof.

Each component of the laser glass of this invention will now be explained in regard to the limitations on the amount thereof.

If the amount of $P_2O_5$ is higher than 70 mole %, the oxide component largely volatilizes off during melting to make it difficult to melt the component in a stable manner, while if the amount of $P_2O_5$ is lower than 55 mole %, the acid resistance of the laser glass becomes poor.

If the amount of $Al_2O_3$ is lower than 1 mole %, the acid resistance of the laser glass becomes poor, while if the amount of $Al_2O_3$ is higher than 15 mole %, the induced emission cross section of the laser glass becomes small, the devitrification resistance of the laser glass becomes poor and it becomes difficult to stably melt such large proportions of the component.

The total amount of $Li_2O$, $Na_2O$, and $K_2O$ in the laser glass composition of this invention is defined to be 10–25 mole %. If the total amount thereof is lower than 10 mole %, the induced emission cross section of the laser glass becomes small, while if the amount thereof is higher than 25 mole %, the acid resistance and the devitrification resistance of the laser glass simultaneously become poor and it becomes difficult to uniformly melt such a large amount of the components.

Each of $Li_2O$ and $Na_2O$ may be incorporated in the glass composition in an amount of up to 25 mole %, and in this range if both are used it is preferred that the molar amount of $Li_2O$ be greater than the proportion of $Na_2O$ since in this case the viscosity of the melt becomes higher and the components tend to be molded easily.

$K_2O$ may be incorporated therein in an amount of up to 8 mole %, but if the amount of this component is higher than that value, the induced emission cross section of the laser glass becomes small.

Furthermore, the total amount of BaO, ZnO, CaO, SrO, and MgO employed in this invention is 5–15 mole % as defined above, and if the total amount thereof is lower than 5 mole %, the acid resistance as well as the devitrification resistance of the laser glass becomes poor, and it becomes difficult to melt these elements sufficiently. On the other hand, if the total proportion thereof is higher than 15 mole %, the induced emission cross section of the laser glass becomes small and at the same time the non-linear refractive index coefficient thereof becomes high, which results in an unsuitable laser glass. Each of these components may be added in an amount of 15 mole % so long as the total amount thereof is in the aforesaid range.

If the amount of CaO and/or MgO is higher than the amount of BaO, ZnO, and/or SrO, the non-linear refractive index coefficient of the laser glass tends to become lower, but since in this case the induced emission cross section of the laser glass tends to become smaller, the ratio of these oxide components may be suitably selected considering the relative merits of these properties.

The presence of each of $Y_2O_3$ and $La_2O_3$ up to 5 mole % is effective to improve the acid resistance and the devitrification resistance of the laser glass, but if the amount of either $Y_2O_3$ or $La_2O_3$ is over 5 mole %, the induced emission cross section of the laser glass becomes small, and, at the same time, the non-linear refractive index coefficient becomes high, which makes the glass composition unsuitable as a laser glass. While the total amount of $Y_2O_3+La_2O_3$ can be up to 5 mol %, it is preferred that when $Y_2O_3$ is used alone no more than 3 mol % be used.

Also, $GeO_2$ may be incorporated in the glass composition up to 5 mole % to improve the melting property of the components, but if the amount of $GeO_2$ is over this value, it causes a phase separation in the glass, which forms scattering centers for laser light which renders the employment of such a glass composition unsuitable for use as a laser glass.

The presence of $CeO_2$, $Nb_2O_5$, $MnO_2$, and $Ta_2O_5$ up to an amount of 5 mole %, 3 mole %, and 2 mole %, respectively, is effective to prevent the occurence of solarization i.e., when a laser glass is subjected to pumping using a xenon flash lamp, the laser glass turns brown due to ultraviolet light from the xenon flash lamp and gradually tends to reduce in capability to pass the pumping light, finally rendering pumping impossible, but if the amount of each component is over the recited value, the non-linear refractive index coefficient of the laser glass becomes higher, and thus the employment of such a large proportion of the component is unsuitable.

Furthermore, $CeO_2$ and $MnO_2$ form $Ce^{3+}$ ions and $Mn^{2+}$ ions, respectively, in the glass, which serve as a sensitizer for $Nd^{3+}$ ions.

The presence of $Sb_2O_3$ in an amount of up to 1 mole % is effective as a defoaming agent for the melt.

Also, if the proportion of $Nd_2O_3$ is lower than 0.01 mole %, it becomes difficult to oscillate and amplify the laser glass at such amounts, while if the proportion of $Nd_2O_3$ is over 5 mole %, it also becomes difficult to oscillate and amplify the laser glass due to density quenching of fluorescence. The optimum proportion of $Nd_2O_3$ is from about 0.2% to 1.5 mole %.

Moreover, according to another embodiment of this invention, at least one of $Li_2O$, $Na_2O$, $K_2O$, BaO, ZnO, CaO, SrO, MgO, and $Al_2O_3$ may be partially or wholely replaced by the corresponding fluorine compounds, such as LiF, NaF, KF, $BaF_2$, $ZnF_2$, $CaF_2$, $SrF_2$, $MgF_2$, and $AlF_3$, respectively. This embodiment of the invention wherein the metal oxides are partially or wholly replaced by the metal fluorides as described above is quite effective, since in such case the non-linear refractive index coefficient of the laser glass can be reduced to 0.7–0.9×$10^{-13}$ e.s.u.

Examples of laser glasses of this invention are illustrated in Table 1, in which each component is shown by mole percent. Also, the characteristics of each sample are shown in Table 1. In Table 1, $n_2$ is the non-linear refractive index coefficient of the laser glass, the units of which are $\times 10^{-13}$ e.s.u., $\sigma$ is the induced emission cross section, the units of which are $\times 10^{-20}$ cm.$^2$, Da is the acid resistance, the units of which are weight loss percent, and Tg/LT is the value of the transistion temperature (°C) divided by the liquid phase temperature (°C), which shows the extent of devitrification resistance. In addition, the character F added to the upper left corner of a figure in Table 1 means that the corresponding metal fluoride was used, where the cationic ratio in each replacement was constant, i.e., replacement of each component is as follows; $Li_2O \rightarrow 2LiF$, $Na_2O \rightarrow 2NaF$, $K_2O \rightarrow 2KF$, $BaO \rightarrow BaF_2$, $ZnO \rightarrow ZnF_2$, $CaO \rightarrow CaF_2$, $SrO \rightarrow SrF_2$, $MgO \rightarrow MgF_2$, and $Al_2O_3 \rightarrow 2AlF_3$. In this case, in the production of the laser glass, the metal fluoride was used instead of the metal oxide.

It should be noted that in order to determine the full composition of any laser glass formed in the following examples it is often necessary to refer to the three different run number designations in Table 1.

TABLE 1

| No. | $P_2O_5$ | $Al_2O_3$ | $Li_2O$ | $Na_2O$ | $K_2O$ | BaO | ZnO | CaO | SrO |
|---|---|---|---|---|---|---|---|---|---|
| 1 | 60 | 8 | 13 | 7.4 | | | | | |
| 2 | 60 | 8 | 13 | 7.4 | | | | 3 | |
| 3 | 60 | 8 | 13 | 7.4 | | | 3 | | |
| 4 | 60 | 8 | 13 | 7.4 | | 3 | | | |
| 5 | 60 | 8 | 13 | 7.4 | | | | | |
| 6 | 60 | 13 | 13 | 7.4 | | | | | |
| 7 | 60 | 10 | 13 | 1.6 | 7.4 | | | | 7 |
| 8 | 60 | 3 | 13 | 7.4 | 3 | | | | 12 |
| 9 | 55 | 3 | 13 | 7.4 | | | 15 | | |
| 10 | 55 | 3 | 13 | 7.4 | | | | 15 | |
| 11 | 60 | 3 | 13 | 7.4 | | | | | 15 |
| 12 | 60 | 3 | 13 | 7.4 | | | | | |
| 13 | 60 | $F_3$ | $F_{13}$ | $F_{7.4}$ | | | | | |
| 14 | 65 | 5 | 13 | 7.2 | | 5 | | | |
| 15 | 65 | 5 | 12.2 | 7 | | 6 | | | |
| 16 | 65 | 6 | 11 | 6 | | 7 | | | |
| 17 | 65 | 5 | 11 | 6 | | 8 | | | |
| 18 | 65 | 4 | 11 | 6 | | 9 | | | |
| 19 | 65 | 3 | 11 | 6 | | 10 | | | |
| 20 | 65 | 2 | 11 | 6 | | 11 | | | |
| 21 | 65 | 2 | 11 | 6 | | 10 | | | |
| 22 | 60 | 1 | 25 | | | | 5.2 | 5 | |
| 23 | 60 | 1 | | 25 | | 3.8 | 2 | 5 | |
| 24 | 60 | 2 | | 25 | | 5 | | 4 | |
| 25 | 60 | 4.3 | 5 | 4 | 1 | 15 | | | |
| 26 | 60 | 6 | $F_{12}$ | 2 | | $F_{15}$ | | | |
| 27 | 60 | 2 | 17 | 1.5 | | 5 | 10 | | |
| 28 | 65 | 2 | $F_7$ | 5.7 | | 7 | $F_7$ | | |
| 29 | 65 | 6 | 15 | | | 3 | 5 | | |
| 30 | 70 | 3 | 10 | 1 | | 3.2 | | 10 | |
| 31 | 60 | 3 | $F_{12}$ | $F_8$ | | $F_6$ | | $F_5$ | |
| 32 | 60 | $F_8$ | $F_{10}$ | 9 | | $F_7$ | | | |
| 33 | 65 | 8 | 12 | | | 5.8 | | | |
| 34 | 60 | 2 | 25 | | | 5 | | 4.1 | |
| 35 | 65 | 3 | | 20 | | | 5 | | |
| 36 | 65 | 8 | $F_{11}$ | | | $F_7$ | | | |
| 37 | 70 | $F_7$ | $F_6$ | 7 | | 4 | 1 | | |
| 38 | 70 | 3 | 11 | 4 | | 3 | 2 | | |
| 39 | 70 | $F_6$ | 7 | 5 | | 5.2 | | | |
| 40 | 70 | 5 | 14 | | | 7 | | | |
| 41 | 70 | 4 | 9 | 2 | | | | 9 | |
| 42 | 70 | 6 | 10 | | | 8 | | | |
| 43 | 65 | 6 | 11 | 6.2 | | | 9.8 | | |
| 44 | 70 | 5 | 11 | 6.2 | | | 5.8 | | |
| 45 | 65 | 7.8 | 13 | 7.2 | | 5 | | | |
| 46 | 65 | 6 | 11 | 6 | | 3 | $F_7$ | | |
| 47 | 65 | 6 | 11 | 6 | | | 10 | | |
| 48 | 70 | 6 | 11 | 6 | | 5 | | | |
| 49 | 68 | 5.8 | 11 | 6.2 | | | | | $F_5$ |
| 50 | 68 | 4 | 11 | 6.2 | | | | | $F_5$ |
| 51 | 70 | 5.8 | 11 | 6.2 | | | | | $F_5$ |
| 52 | 70 | 4 | 11 | 6.2 | | | | | $F_5$ |
| 53 | 70 | 2 | 11 | 7 | | 6 | | | |
| 54 | 70 | 2 | 12 | 8 | | 6 | | | |
| 55 | 70 | 1 | 12 | 8 | | 6 | | | |
| 56 | 70 | 1 | 12 | 7 | | 8 | | | |
| 57 | 67 | 6 | 8.2 | 9 | | | $F_5$ | | |
| 58 | 65 | 6 | 10 | 10.2 | | | 5 | | |
| 59 | 65 | 6 | 10 | 10.2 | | | | | $F_5$ |
| 60 | 65 | 6 | 8.2 | 9 | | 7 | | | |
| 61 | 65 | 6 | 8.2 | 9 | | $F_8$ | | | |
| 62 | 65 | 6 | 13 | 7.2 | | 5 | | | |
| 63 | 65 | 6 | 11 | 6.2 | | | $F_7$ | | |

| No. | MgO | $Y_2O_3$ | $La_2O_3$ | $GeO_2$ | $CeO_2$ | $Nb_2O_5$ | $MnO_2$ | $Ta_2O_5$ |
|---|---|---|---|---|---|---|---|---|
| 1 | 10 | | | | | 0.4 | | |
| 2 | 7 | | | | | 0.4 | | |
| 3 | 7 | | | | | 0.4 | | |
| 4 | 7 | | | | | 0.4 | | |

TABLE 1-continued

| No. | | | | | | | |
|---|---|---|---|---|---|---|---|
| 5 | 7 | | | 3 | | 0.4 | |
| 6 | 5 | | | | | 0.4 | |
| 7 | | | | | | 0.4 | |
| 8 | | | | 0.6 | | 0.4 | |
| 9 | | 3 | | 2 | 0.4 | | |
| 10 | | 3 | | 2 | 0.4 | | |
| 11 | | | 0.6 | | 0.4 | | |
| 12 | 15 | | 0.6 | | 0.4 | | |
| 13 | $F_{15}$ | | 0.6 | | 0.4 | | |
| 14 | | 2.8 | | | | 0.8 | |
| 15 | | | | | 3.6 | | |
| 16 | | 3 | | | | 0.6 | 0.2 |
| 17 | | 3 | | | | 0.8 | |
| 18 | | 3 | | | | 0.8 | |
| 19 | | 3 | | | | 0.7 | 0.1 |
| 20 | | 3 | | | | 0.8 | |
| 21 | | 4 | | | | 0.8 | |
| 22 | | 2 | 1 | | 0.5 | | |
| 23 | | | | 1 | 1 | | |
| 24 | 0.5 | 2.5 | | | | | |
| 25 | 3 | | 5 | | | | 0.2 |
| 26 | | 2.95 | | | 2 | | |
| 27 | | 1 | 2 | | | | |
| 28 | | | 5 | | | | |
| 29 | | 1 | | | | | |
| 30 | | | | | | | |
| 31 | | | | 5 | | | |
| 32 | | | | 3 | | | |
| 33 | 2 | | 4 | | | 2 | |
| 34 | | 2 | | | | | |
| 35 | 1 | | | | 3 | | |
| 36 | | 5 | | | | | 2 |
| 37 | | 2.7 | | | | | |
| 38 | 2.2 | | 3 | | | | |
| 39 | 5 | | | | | | |
| 40 | | 2 | | | | 0.8 | |
| 41 | | | | 4 | | 0.8 | |
| 42 | | | | 4 | | | 0.8 |
| 43 | | | | | | 0.8 | |
| 44 | | | | | | 0.8 | |
| 45 | | | | | | 0.8 | |
| 46 | | | | | | 0.8 | |
| 47 | | | | | | 0.8 | |
| 48 | | | | | | 0.8 | |
| 49 | | | 2 | | | 0.8 | |
| 50 | 1.8 | | 2 | | | 0.8 | |
| 51 | | | | | | 0.8 | |
| 52 | | 1.8 | | | | 0.8 | |
| 53 | | | 2 | | | 0.8 | |
| 54 | | | | | | 0.8 | |
| 55 | | | 1 | | | 0.8 | |
| 56 | | | | | | 0.8 | |
| 57 | 1.8 | | 1 | | | 0.8 | |
| 58 | 1.8 | | | | | 0.8 | |
| 59 | 1.8 | | | | | 0.8 | |
| 60 | 2.8 | | | | | 0.8 | |
| 61 | | 1.8 | | | | 0.8 | |
| 62 | 1.8 | | | | | 0.8 | |
| 63 | 2.8 | | | | | 0.8 | |

| No. | $Sb_2O_3$ | $Nd_2O_3$ | $n_2$ | $\sigma$ | Da | Tg/LT |
|---|---|---|---|---|---|---|
| 1 | | 1.2 | 1.13 | 4.86 | 0.150 | 0.472 |
| 2 | | 1.2 | 1.13 | 4.87 | 0.150 | 0.481 |
| 3 | | 1.2 | 1.14 | 4.90 | 0.148 | 0.474 |
| 4 | | 1.2 | 1.14 | 5.02 | 0.145 | 0.474 |
| 5 | | 1.2 | 1.16 | 4.86 | 0.133 | 0.479 |
| 6 | | 1.2 | 1.20 | 4.83 | 0.135 | 0.462 |
| 7 | | 0.6 | 1.22 | 4.72 | 0.015 | 0.453 |
| 8 | | 0.6 | 1.28 | 4.89 | 0.293 | 0.462 |
| 9 | 0.6 | 0.6 | 1.30 | 5.36 | 0.193 | 0.492 |
| 10 | 0.6 | 0.6 | 1.28 | 5.32 | 0.182 | 0.520 |
| 11 | | 0.6 | 1.32 | 5.20 | 0.241 | 0.473 |
| 12 | | 0.6 | 1.31 | 5.15 | 0.239 | 0.480 |
| 13 | | 0.6 | 0.82 | 5.18 | 0.237 | 0.523 |
| 14 | | 1.2 | 1.26 | 5.23 | 0.145 | 0.482 |
| 15 | | 1.2 | 1.30 | 5.24 | 0.140 | 0.473 |
| 16 | | 1.2 | 1.28 | 4.93 | 0.130 | 0.492 |
| 17 | | 1.2 | 1.28 | 5.12 | 0.270 | 0.483 |
| 18 | | 1.2 | 1.29 | 5.27 | 0.350 | 0.475 |
| 19 | | 1.2 | 1.29 | 5.50 | 0.510 | 0.452 |
| 20 | | 1.2 | 1.30 | 5.72 | 0.553 | 0.450 |
| 21 | | 1.2 | 1.32 | 5.63 | 0.542 | 0.460 |
| 22 | | 0.3 | 1.27 | 6.10 | 0.92 | 0.453 |

TABLE 1-continued

| | | | | | |
|---|---|---|---|---|---|
| 23 | | 1.2 | 1.18 | 6.18 | 0.89 | 0.442 |
| 24 | | 1 | 1.25 | 5.70 | 0.80 | 0.462 |
| 25 | | 2.5 | 1.32 | 4.62 | 0.53 | 0.473 |
| 26 | | 0.05 | 1.01 | 5.02 | 0.13 | 0.489 |
| 27 | | 1.5 | 1.20 | 5.53 | 0.48 | 0.452 |
| 28 | | 1.3 | 1.19 | 5.42 | 0.40 | 0.456 |
| 29 | | 5 | 1.36 | 4.98 | 0.03 | 0.482 |
| 30 | 0.3 | 2.5 | 1.25 | 5.24 | 0.22 | 0.470 |
| 31 | 0.2 | 0.8 | 0.97 | 5.33 | 0.19 | 0.490 |
| 32 | | 3 | 0.89 | 4.49 | 0.11 | 0.523 |
| 33 | | 1.2 | 1.37 | 4.32 | 0.13 | 0.488 |
| 34 | 0.5 | 1.4 | 1.23 | 5.98 | 0.73 | 0.471 |
| 35 | | 3 | 1.40 | 5.63 | 0.18 | 0.464 |
| 36 | | 2 | 1.38 | 4.39 | 0.02 | 0.487 |
| 37 | 0.3 | 2 | 1.25 | 4.41 | 0.15 | 0.483 |
| 38 | | 1.8 | 1.24 | 5.20 | 0.37 | 0.477 |
| 39 | | 1.8 | 1.30 | 5.00 | 0.09 | 0.480 |
| 40 | | 1.2 | 1.26 | 5.26 | 0.21 | 0.475 |
| 41 | | 1.2 | 1.32 | 5.35 | 0.08 | 0.482 |
| 42 | | 1.2 | 1.35 | 5.12 | 0.06 | 0.497 |
| 43 | | 1.2 | 1.17 | 4.88 | 0.23 | 0.462 |
| 44 | | 1.2 | 1.09 | 4.95 | 0.25 | 0.451 |
| 45 | | 1.2 | 1.13 | 4.20 | 0.18 | 0.468 |
| 46 | | 1.2 | 1.18 | 4.83 | 0.31 | 0.472 |
| 47 | | 1.2 | 1.20 | 4.85 | 0.28 | 0.470 |
| 48 | | 1.2 | 1.15 | 4.89 | 0.30 | 0.463 |
| 49 | | 1.2 | 1.10 | 4.83 | 0.56 | 0.470 |
| 50 | | 1.2 | 1.12 | 5.26 | 0.29 | 0.482 |
| 51 | | 1.2 | 1.10 | 4.82 | 0.28 | 0.462 |
| 52 | | 1.2 | 1.15 | 5.27 | 0.37 | 0.468 |
| 53 | | 1.2 | 1.03 | 6.10 | 0.89 | 0.420 |
| 54 | | 1.2 | 1.04 | 5.83 | 0.87 | 0.420 |
| 55 | | 1.2 | 1.02 | 6.10 | 0.90 | 0.413 |
| 56 | | 1.2 | 1.03 | 5.94 | 0.90 | 0.410 |
| 57 | | 1.2 | 1.17 | 5.13 | 0.21 | 0.473 |
| 58 | | 1.2 | 1.20 | 5.37 | 0.26 | 0.470 |
| 59 | | 1.2 | 1.23 | 5.29 | 0.25 | 0.475 |
| 60 | | 1.2 | 1.26 | 5.48 | 0.15 | 0.482 |
| 61 | | 1.2 | 1.25 | 5.30 | 0.15 | 0.480 |
| 62 | | 1.2 | 1.21 | 5.56 | 0.24 | 0.479 |
| 63 | | 1.2 | 1.24 | 5.13 | 0.17 | 0.483 |

For the preparation of the phosphate base laser glasses of this invention as shown in the Table the components were sufficiently mixed, melted over a period of about 3 to about 5 hours and then refined at 1200°–1500° C. in a platinum crucible or a ceramic crucible, and, after homogenizing the melt by means of a stirrer at 900°–1100° C. for about 4 to about 10 hours, the melt was molded. As one skilled in the art will appreciate, at the time the materials are initially mixed they are not yet a "glass", but soon change from their initial powdery form to a sticky liquid form, and thereafter, with increased temperature, they yield a glass. All processings were, of course, at atmospheric pressure.

When the fluorides were used, it was necessary to melt and refine the mixture at 800°–1100° C. so that the fluorine did not volatilize off during melting. Also, since fluorides tend to form striae in the glass, the melting and molding of the mixture containing the fluorides were conducted with care.

Thereafter, the glass molding was subjected to precise annealing to remove residual strain to provide a large laser glass free of strain. Annealing was conducted by first setting the temperature at about 450° C. and then cooling at a rate of about 0.25° to about 0.50° C./hour.

While the invention has been described in detail and with reference to specific embodiments thereof, it will be apparent to one skilled in the art that various changes and modifications can be made therein without departing from the spirit and scope thereof.

What is claimed is:

1. A phosphate base laser glass possessing an induced emission cross section $\sigma$ of 4.50 to $5.20 \times 10^{-20}$ cm$^2$, a non-linear refractive index coefficient $n_2$ of 1.13 to $1.24 \times 10^{-13}$ e.s.u., an acid resistance weight loss Da of 0.15 to 0.17% by weight and a devitrification resistance Tg/LT of 0.470 to 0.485, consisting of
   (i) 58 to 67% $P_2O_5$,
   (ii) 4 to 10% $Al_2O_3$,
   (iii) 9 to 15% $Li_2O$,
   (iv) 4 to 10% $Na_2O$,
   (v) 0 to 12% CaO, 0 to 12% MgO, 0 to 12% $CaF_2$, 0 to 12% $MgF_2$, the total proportion of said CaO, MgO, $CaF_2$ and $MgF_2$ being 5 to 12%,
   (vi) 0 to 3% $Y_2O_3$,
   (vii) 0.2 to 0.8% $Nb_2O_5$, and
   (viii) 0.2 to 1.5% $Nd_2O_3$,
said percentages being by mole.

2. The phosphate base laser glass as claimed in claim 1 wherein one or more of $Li_2O$, $Na_2O$, or $Al_2O_3$ is partially or wholly replaced by LiF, NaF, or $AlF_3$, respectively.

3. The phosphate base laser glass as claimed in claim 1, wherein the mole percent of $Li_2O$ is greater than the mole percent of $Na_2O$.

* * * * *